(12) United States Patent
Son

(10) Patent No.: US 7,910,846 B2
(45) Date of Patent: Mar. 22, 2011

(54) STEERING COLUMN ASSEMBLY FOR VEHICLE

(75) Inventor: Who Guen Son, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 304 days.

(21) Appl. No.: 12/150,773

(22) Filed: Apr. 30, 2008

(65) Prior Publication Data

US 2009/0114512 A1    May 7, 2009

(30) Foreign Application Priority Data

Nov. 7, 2007   (KR) .................. 10-2007-0113312

(51) Int. Cl.
 *H01H 9/00*     (2006.01)
(52) U.S. Cl. ..................... 200/61.54; 200/335
(58) Field of Classification Search ................ 200/61.54
See application file for complete search history.

(56) References Cited

U.S. PATENT DOCUMENTS 5,883,348 A * 3/1999 Yokoyama ................. 200/61.54

FOREIGN PATENT DOCUMENTS

JP        09-320724 A    12/1997

* cited by examiner

*Primary Examiner* — Renee Luebke
*Assistant Examiner* — Lisa Klaus
(74) *Attorney, Agent, or Firm* — Edwards Angell Palmer & Dodge LLP; Peter F. Corless

(57) ABSTRACT

A steering column assembly includes a light switch and a wiper switch assembled to a column tube of a column shaft via an assembly bracket. The assembly bracket includes a body, to which the light switch and the wiper switch are coupled, and a coupling section, to which a top portion of the column tube is fixed. With the assembly, the light switch and the wiper switch can be easily and closely assembled to the column. Also, the assembly tolerance between the column and the assembly bracket can be minimized.

3 Claims, 6 Drawing Sheets

PRIOR ART

PRIOR ART

STEERING COLUMN ASSEMBLY FOR VEHICLE

CROSS-REFERENCE TO RELATED APPLICATIONS

This application claims priority to Korean Application No. 10-2007-0113312, filed on Nov. 7, 2007, the disclosure of which is incorporated herein by reference.

BACKGROUND

1. Technical Field

The present invention relates to a steering column assembly for a vehicle.

2. Background Art

A steering system of a vehicle determines the direction of the vehicle in response to the manipulation of a steering wheel.

As shown in FIGS. 1 and 2, in conventional steering systems, a light switch 30 for operating headlights and a wiper switch 40 for operating wipers are assembled to both side portions of a column tube 20, into which a column shaft 10 is inserted. A steel plate 60 is assembled to the top end of the column tube 20 by welding. A Steering Roll Connector (SRC) 50 for supplying power is assembled to the light switch 30 and the wiper switch 40.

The steel plate is coupled to the column tube by welding. However, this welding increases the material cost and the processing cost while degrading the dimensional stability of parts, thereby increasing assembly tolerance. Accordingly, in the conventional steering systems, friction may occur between adjacent parts when a steering wheel is turned.

The information disclosed in this Background section is only for enhancement of understanding of the background of the invention and should not be taken as an acknowledgement or any form of suggestion that this information forms the prior art that is already known to a person skilled in the art.

SUMMARY

The present invention has been made to solve the foregoing problems with the prior art, and therefore the present invention provides a steering column assembly for a vehicle, which is designed to minimize the assembly tolerance between parts, to which a light switch and a wiper switch are assembled.

According to an aspect of the present invention, the steering column assembly includes a light switch and a wiper switch assembled to a column tube of a column shaft via an assembly bracket. The assembly bracket includes a body, to which the light switch and the wiper switch are coupled, and a coupling section, to which the top portion of the column tube is fixed.

Preferably, the coupling section may have at least one wedge-shaped clip, and the column tube may at least one clip recess, into which the clip is inserted. Also preferably, the coupling section may include at least one coupling piece disposed on the bottom end thereof. The coupling piece has a coupling hole, for example, for coupling to the column tube via fastening means. Each of the clip and the coupling piece may be arranged on a corresponding one of a plurality of extension lines, which perpendicularly cross each other at the center of the coupling section.

Preferably, the coupling section may be shaped as a cylinder having an inside diameter matching the outside diameter of the column tube, and the coupling section may have at least one protrusion in the inner circumference thereof, the protrusion abutting against the top portion of the column tube when the column tube is inserted into the coupling section.

With the steering column assembly as set forth above, the light switch and the wiper switch can be easily and finely assembled to the steering column. Furthermore, the assembly tolerance between the steering column and the assembly bracket can be minimized.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
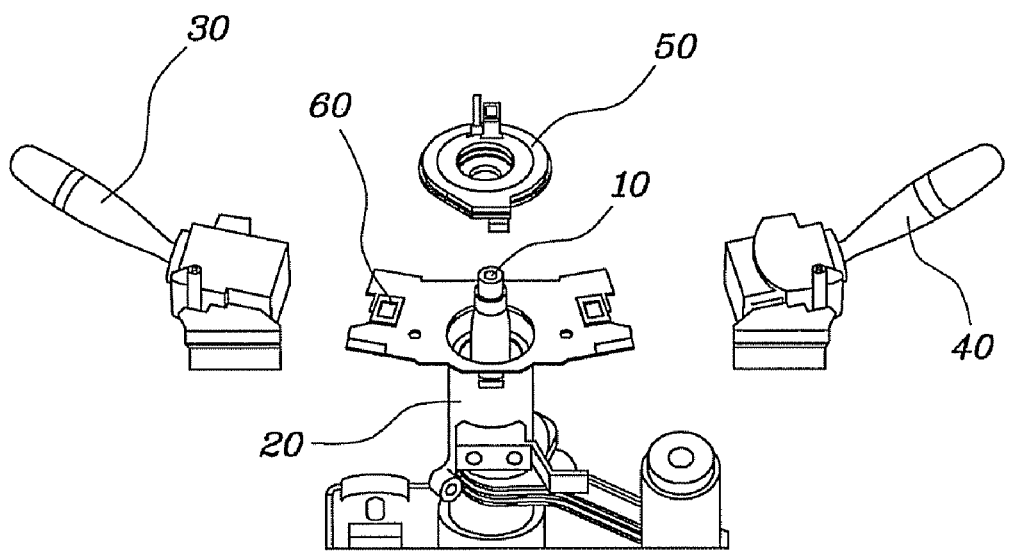
FIG. 1 is an exploded perspective view illustrating a conventional steering column assembly for a vehicle.
Figure 2:
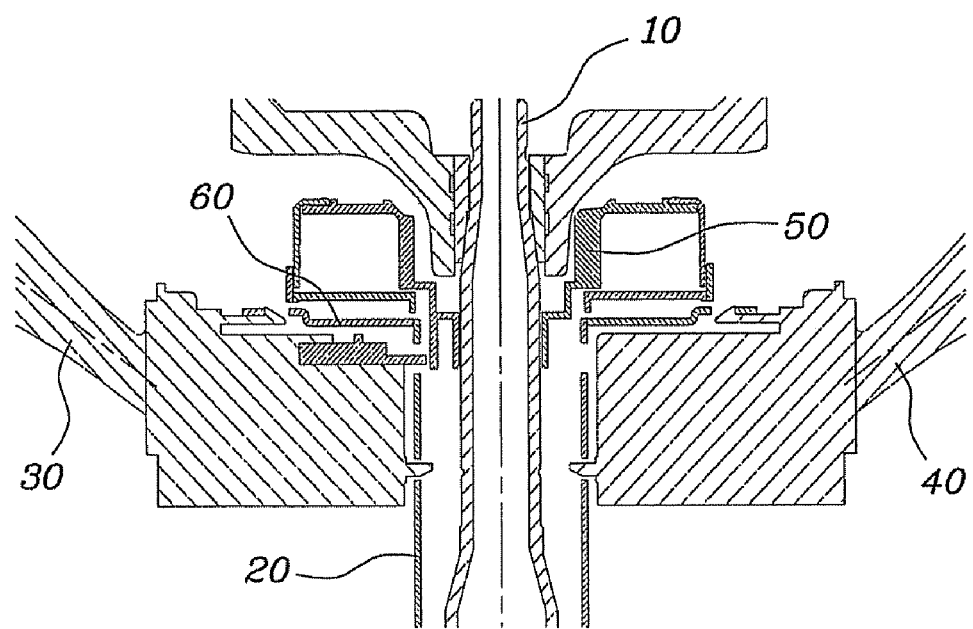
FIG. 2 is a cross-sectional view of the conventional steering column assembly of FIG. 1.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 3:
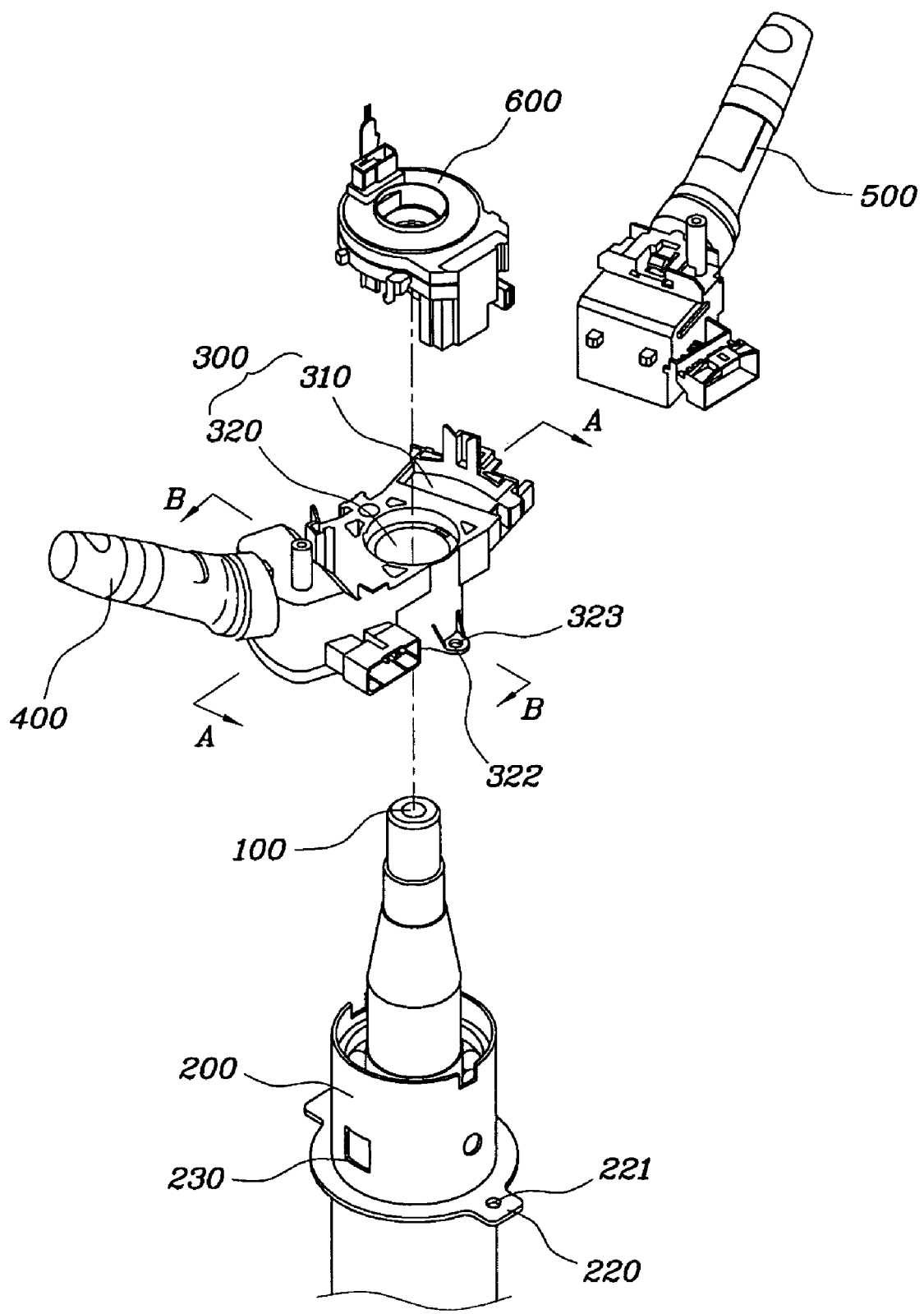
FIG. 3 is an exploded perspective view illustrating a steering column assembly for a vehicle according to a preferred embodiment of the present invention.
Figure 4:
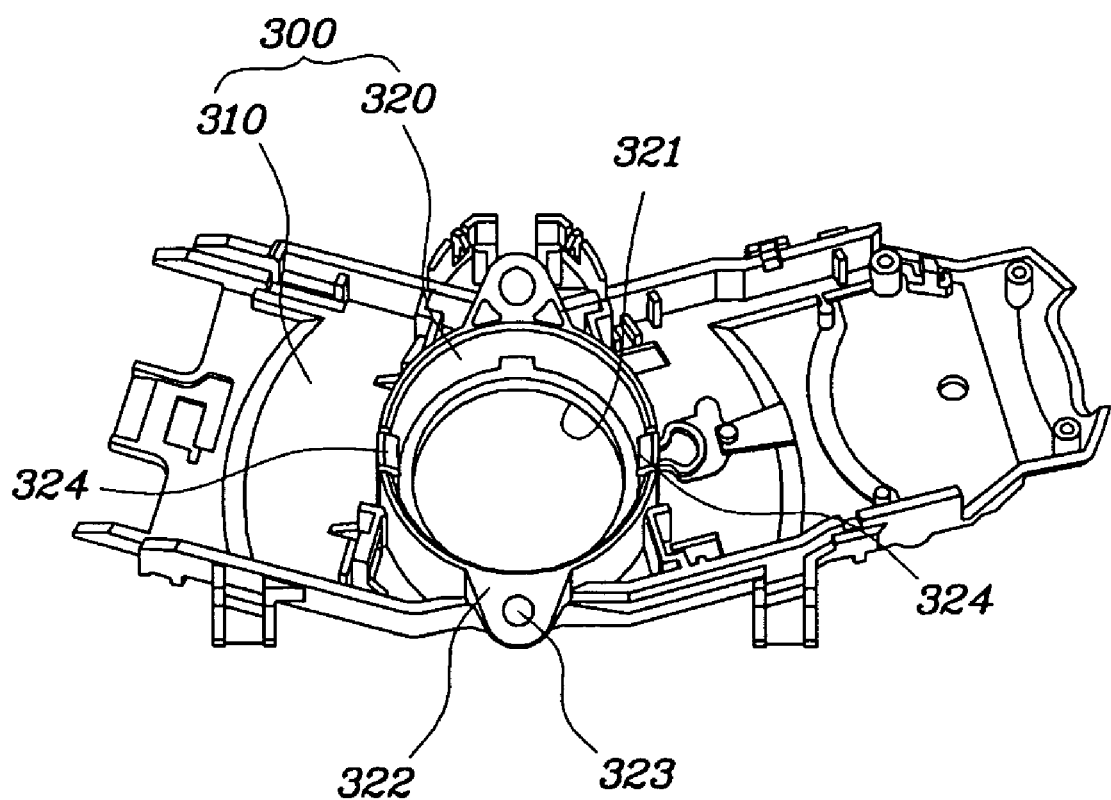
FIG. 4 is a perspective view illustrating the assembly bracket of the steering column assembly of FIG. 3.

As shown in FIGS. 3 and 4, in the steering column assembly for a vehicle of according to a preferred embodiment of the present invention, a light switch 400 and a wiper switch 500 are assembled to a column tube 200 of a column shaft 100 via an assembly bracket 300. The assembly bracket 300 is assembled with the light switch 400 and the wiper switch 500, and is also fixed to the column tube 200 via a screw bolt 700 and a clip 324.

An SRC 600 for supplying power to the light switch 400 and the wiper switch 500 is assembled to the top portion of the assembly bracket 300. A bearing 110 is arranged between the column shaft 100 and the column tube 200.

According to an embodiment of the present invention, the assembly bracket 300 is made of a plastic molding material. The assembly bracket 300 includes a body 310, which is coupled, at one side, with the light switch 400 and, at the other side, with the wiper switch 500, and a coupling section 320, which is fixed to the column tube 200 via the clip 324 and the fastening means such as the screw bolt 700.

Specifically, the light switch 400 is integrally coupled with the body 310 of the assembly bracket 300. Accordingly, in the steering column assembly of the present invention, the assembly bracket 300, to which the light switch 400 is integrally coupled, the wiper switch 500, and the SRC are assembled to the column tube 200.

The coupling section 320 of the assembly bracket 300 is in the form of a cylinder, which has an inside diameter matching the outside diameter of the column tube 200. Particularly, when the assembly bracket 300 is coupled with the column tube 200, the outer circumference of the column tube 200 slides and closely contacts the inner circumference of the coupling section 320, so that the assembly bracket 300 and the column tube 200 can be easily and closely coupled with each other.

Figure 5:
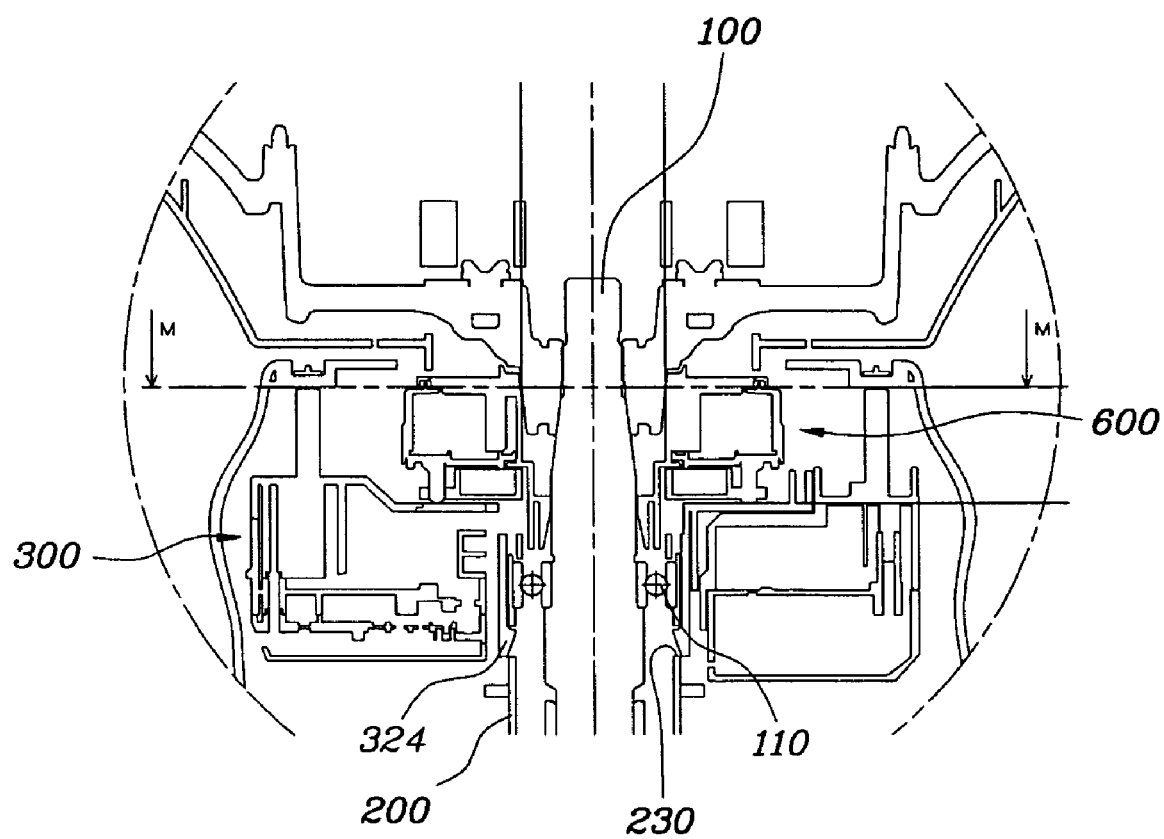
FIG. 5 is a cross-sectional view taken along the line A-A of FIG. 3.
Figure 6:
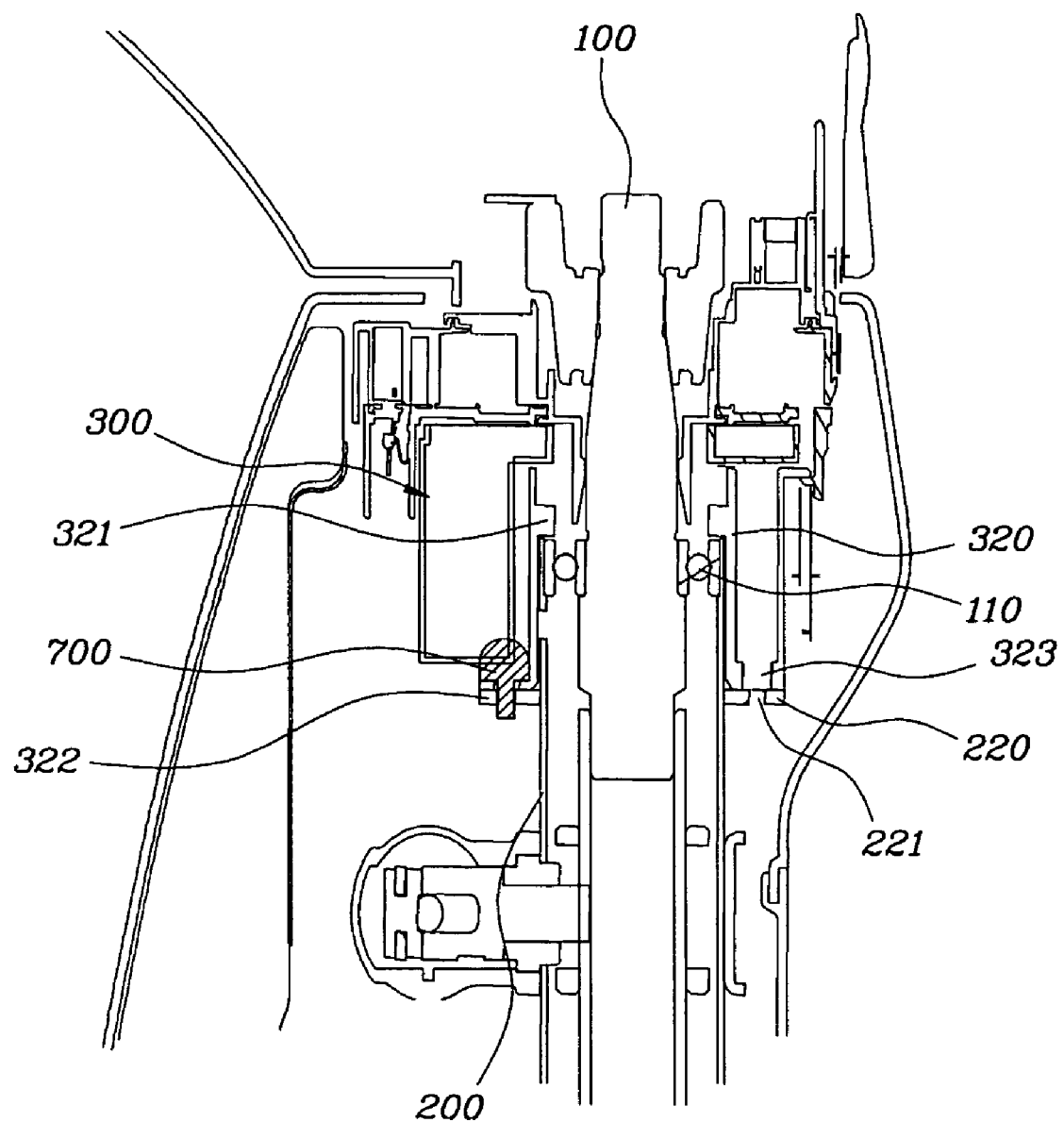
FIG. 6 is a cross-sectional view taken along the line B-B of FIG. 3.

As shown in FIG. 5 or 6, at least one protrusion 321 is formed in the inner circumference of the coupling section 320. When the column tube 200 is inserted into the coupling section 320, the protrusion 321 abuts against the top portion of the column tube 200.

Inside the lower portion of the coupling part 320, the wedge-shaped clip 324 is provided. The clip 324 is inserted into a clip recess 230 in the column tube 200 when the assembly bracket 300 and the column tube 200 are coupled with each other. Accordingly, the assembly bracket 300 and the column tube 200 are easily and correctly assembled to each other. Furthermore, it is possible to prevent a gap from being formed in a vertical direction between the assembly bracket 300 and the column tube 200.

A pair of coupling pieces 322, 323 is provided at the bottom end of the coupling section 320. When the assembly bracket 300 and the column tube 200 are coupled to each other, the coupling piece 322 is fixed to the column tube 200 via a fastening means such as the screw bolt 700. The column tube 200 is provided with a fixing piece 220, which has a coupling hole 221 for coupling with the coupling piece 322 through the screw bolt 700.

It is preferable that each of the clip 324 and the coupling piece 322 be arranged on a corresponding one of a plurality of extension lines that perpendicularly cross each other at the center of the coupling section 320. Accordingly, the fixing between the assembly bracket 300 and the column tube 200 is enabled by the clip 324 and the coupling piece 322, and the clip 324 and the coupling piece 322 are arranged perpendicularly with respect to each other at the center of the coupling section 320. The clip 324 tightly fixes the assembly bracket 300 to the column tube 200, and the screw bolt 700 tightly couples the coupling piece 322 to the fixing piece 220.

Furthermore, a vertically-extending rib (not shown) may be formed in the inner circumference of the coupling section 320. The rib can minimize the assembly tolerance between the assembly bracket 300 and the column tube 200, and can also prevent a gap from being formed in the rotational direction between the assembly bracket 300 and the column tube 200.

While the present invention has been described with reference to the particular illustrative embodiments, it is not to be restricted by the embodiments, but only by the appended claims. It is to be appreciated that those skilled in the art can change or modify the embodiments without departing from the scope and spirit of the present invention.

What is claimed is:

1. A steering column assembly comprising a light switch and a wiper switch assembled to a column tube of a column shaft via an assembly bracket, wherein the assembly bracket includes a body, to which the light switch and the wiper switch are coupled, and a coupling section, to which a top portion of the column tube is fixed, wherein the coupling section has at least one wedge-shaped clip, and the column tube has at least one clip recess into which the clip is inserted, and wherein the coupling section is shaped as a cylinder having an inside diameter matching an outside diameter of the column tube, and wherein the coupling section has at least one protrusion in an inner circumference thereof, the protrusion abutting against a top portion of the column tube when the column tube is inserted into the coupling section.

2. The steering column assembly according to claim 1, wherein the coupling section includes at least one coupling piece disposed on a bottom thereof, wherein the coupling piece has a coupling hole for coupling to the column tube via fastening means.

3. The steering column assembly according to claim 2, wherein each of the clip and the coupling piece is arranged on a corresponding one of a plurality of extension lines, which perpendicularly cross each other at a center of the coupling section.

* * * * *